United States Patent
Tsuchimoto et al.

(10) Patent No.: US 11,459,450 B2
(45) Date of Patent: Oct. 4, 2022

(54) RESIN COMPOSITION FOR INJECTION FORMING

(71) Applicant: NIPPON CLOSURES CO., LTD., Tokyo (JP)

(72) Inventors: Daisuke Tsuchimoto, Kanagawa (JP); Go Oota, Kanagawa (JP); Katsumi Hashimoto, Kanagawa (JP)

(73) Assignee: NIPPON CLOSURES CO., LTD., Tokyo (JP)

( * ) Notice: Subject to any disclaimer, the term of this patent is extended or adjusted under 35 U.S.C. 154(b) by 69 days.

(21) Appl. No.: 15/734,051

(22) PCT Filed: May 22, 2019

(86) PCT No.: PCT/JP2019/020278
§ 371 (c)(1),
(2) Date: Dec. 1, 2020

(87) PCT Pub. No.: WO2019/235222
PCT Pub. Date: Dec. 12, 2019

(65) Prior Publication Data
US 2021/0214534 A1    Jul. 15, 2021

(30) Foreign Application Priority Data

Jun. 8, 2018 (JP) .............................. JP2018-110067
Aug. 16, 2018 (JP) .............................. JP2018-153118

(51) Int. Cl.
C08L 23/06 (2006.01)

(52) U.S. Cl.
CPC ............ *C08L 23/06* (2013.01); *C08L 2205/03* (2013.01)

(58) Field of Classification Search
CPC ...... C08L 23/06; C08L 23/08; C08L 23/0807; C08L 23/0815; C08L 51/06; C08L 23/0861; C08L 2205/03
See application file for complete search history.

(56) References Cited

U.S. PATENT DOCUMENTS

| | | | | |
|---|---|---|---|---|
| 5,278,229 A | * | 1/1994 | Asano | C08G 81/024 525/240 |
| 5,372,863 A | * | 12/1994 | Nishikawa | C08L 51/06 206/277 |
| 7,182,986 B1 | * | 2/2007 | Haneda | B29C 43/146 215/349 |
| 2002/0128391 A1 | | 9/2002 | Nakatsukasa et al. | |
| 2008/0003390 A1 | | 1/2008 | Hayashi et al. | |
| 2012/0064269 A1 | | 3/2012 | Vogt et al. | |
| 2016/0060402 A1 | | 3/2016 | Yonekawa et al. | |
| 2020/0047397 A1 | * | 2/2020 | Minkwitz | B32B 27/304 |

FOREIGN PATENT DOCUMENTS

| | | |
|---|---|---|
| CN | 101735537 | 6/2010 |
| JP | 10-204229 | 8/1998 |
| JP | 2002-249595 | 9/2002 |
| JP | 2008-164130 | 7/2008 |
| JP | 2012-521905 | 9/2012 |
| WO | 2005/105437 | 11/2005 |
| WO | 2014/163149 | 10/2014 |

OTHER PUBLICATIONS

Extended European Search Report dated Feb. 7, 2022 in corresponding European Patent Application No. 19814939.5.
Mitsui Chemicals: "ADMER GT6E", Aug. 1, 2019, XP055877852, Retrieved from the Internet: URL:https://admer.eu/user-data/downloads/GT6E%20TDS.pdf.
International Search Report dated Aug. 20, 2019 in International (PCT) Application No. PCT/JP2019/020278.

* cited by examiner

*Primary Examiner* — Jeffrey C Mullis
(74) *Attorney, Agent, or Firm* — Wenderoth, Lind & Ponack, L.L.P.

(57) ABSTRACT

A resin composition for injection forming containing a high-density polyethylene, an ethylene-vinyl alcohol copolymer and an acid-modified linear low-density polyethylene, characterized in that the ethylene-vinyl alcohol copolymer is contained in an amount of 35 to 90 parts by mass and the acid-modified linear low-density polyethylene is contained in an amount of 10 to 35 parts by mass per 100 parts by mass of the high-density polyethylene.

1 Claim, No Drawings

RESIN COMPOSITION FOR INJECTION FORMING

TECHNICAL FIELD

This invention relates to a resin composition for injection forming. More specifically, the invention relates to a resin composition for injection forming containing a high-density polyethylene and an ethylene-vinyl alcohol copolymer, as well as to an injection-formed body obtained by injection-forming the resin composition.

BACKGROUND ART

The ethylene-vinyl alcohol copolymer (hereinafter often abbreviated as EVOH) has been known as a resin having excellent oxygen-barrier property, and has been widely used in combination with an olefin resin such as polyethylene or the like in the field of packing materials such as containers in order to prevent the contents from being deteriorated with oxygen.

For example, patent documents 1 and 2 are proposing formed bodies such as injection-formed bodies obtained by forming resin compositions that contain olefin resin and EVOH. In the formed bodies proposed by these patent documents, the EVOH is oriented and distributed in the form of a layer in a matrix of the olefin resin to exhibit excellent oxygen-barrier property.

The adhesiveness, however, is poor between the EVOH and the olefin resin, and delamination easily takes place between the layers thereof. When rubbed, therefore, the surface is easily cracked or is abraded. Particularly, when the composition is used for such products as a cap and a spout that slide relative to each other relying, for example, upon a screw engagement, the above problem appears conspicuously posing, therefore, limitation on its use. This problem can be learned from the fact that the above patent documents are not at all evaluating about the cracks or the surface peeling.

The patent document 2, further, suggests about improving the mechanical properties by blending the above resin composition with a maleic acid-modified olefin or a modified elastomer as a compatibilizer.

The above compatibilizer has been known to serve as an adhesive for the olefin resin and the EVOH. Namely, in the above-mentioned resin composition, the compatibilizer is distributed in the interface between the olefin resin and the EVOH, whereby the adhesiveness is improved between the two and mechanical properties are also improved.

Here, the packing materials such as caps and spouts are widely using a high-density polyethylene among the olefin resins by taking into consideration the heat resistance that is large enough to withstand the so-called hot packing and the slipperiness in the threaded portion. According to the study conducted by the present inventors, however, when the resin composition for injection forming contains a high-density polyethylene as the olefin resin as well as the compatibilizer, the mechanical properties can be improved only very poorly. Therefore, the caps and spouts obtained by injection-forming the above resin composition are accompanied by the problems of cracks and surface abrasion being caused by the compatibilizer that is added, hindering the EVOH-containing resin composition for injection forming from being put into practical use.

PRIOR ART DOCUMENTS

Patent Documents

Patent document 1: Japanese Patent Laid-Open No. 2002-249595
Patent document 2: WO2014/163149

OUTLINE OF THE INVENTION

Problems that the Invention is to Solve

It is, therefore, an object of the present invention to provide a resin composition for injection forming which contains a high-density polyethylene and an ethylene-vinyl alcohol copolymer, and from which an injection-formed body can be obtained effectively solving such problems as cracks and surface peeling, as well as to provide an injection-formed body.

Means for Solving the Problems

The present inventors have studied about the resin compositions for injection forming containing high-density polyethylene and ethylene-vinyl alcohol copolymer by conducting experiments to a large extent. As a result, the inventors have discovered that upon blending a modified polymer obtained by modifying a linear low-density polyethylene with an unsaturated carboxylic acid such as maleic anhydride, the adhesiveness can be improved between the high-density polyethylene and the ethylene-vinyl alcohol copolymer, and there can be obtained an injection-formed body effectively solving such defects as cracks and surface peeling yet without impairing the oxygen-barrier property inherent in the ethylene-vinyl alcohol copolymer. The present invention was thus completed.

That is, according to the present invention, there is provided a resin composition for injection forming containing a high-density polyethylene, an ethylene-vinyl alcohol copolymer and an acid-modified linear low-density polyethylene, characterized in that:

the ethylene-vinyl alcohol copolymer is contained in an amount of 35 to 90 parts by mass and the acid-modified linear low-density polyethylene is contained in an amount of 10 to 35 parts by mass per 100 parts by mass of the high-density polyethylene.

In the resin composition for injection forming of the present invention, it is desired that:
(1) the high-density polyethylene has a density in a range of not less than 0.942 g/cm$^3$ and an MFR at 190° C. in a range of 0.1 to 10 g/10 min.;
the ethylene-vinyl alcohol copolymer has an MFR at 210° C. in a range of 20 to 100 g/10 min.; and
the acid-modified linear low-density polyethylene has an MFR at 190° C. in a range of 0.1 to 10 g/10 min.

According to the invention, further, there is provided an injection-formed body that is obtained by forming the above resin composition.

The injection-formed body is, specifically desirably, a cap or a spout.

Effects of the Invention

The resin composition for injection forming of the present invention contains a high-density polyethylene (HDPE) and an ethylene-vinyl alcohol copolymer (EVOH). Upon injection-forming the resin composition containing such components, the EVOH is distributed in the form of a layer (or a belt) and exhibits excellent oxygen-barrier property. In the present invention, a distinguished feature resides in the use of an acid-modified linear low-density polyethylene (acid-modified LLDPE) in addition to the use of the above components.

Namely, a body obtained by injection-forming the resin composition containing the HDPE and the EVOH is accompanied by a serious problem in regard to cracks and surface abrasion when the surface thereof is rubbed, and is hindered from being put into practical use. By blending the above-mentioned acid-modified LLDPE, however, there can be obtained an injection-formed body without impairing oxygen-barrier property inherent in the EVOH and effectively solving the problems of cracks and surface abrasion.

The effect for preventing the cracks or the surface abrasion can be exhibited by adding the acid-modified LLDPE that is obtained by modifying the linear low-density polyethylene (LLDPE) with an acid. The above effect for prevention is not obtained even by using a modified polymer that is obtained by modifying a high-density polyethylene, a polypropylene, an ordinary low-density polyethylene (LDPE) or an SEBS with an acid, or even by using an ionically crosslinked olefin resin (ionomer) (see Examples appearing later).

Though the reason has not yet been clarified why use of the above acid-modified LLDPE would exhibit the effect of preventing cracks or surface abrasion, the present inventors presume it as described below.

That is, the high-density polyethylene (HDPE) has properties such as tensile strength and the like superior to those of other polyethylenes and also has favorable abrasion resistance, heat resistance and slipperiness. Therefore, the high-density polyethylene has been widely used in the production of formed bodies such as caps and spouts. On the other hand, the EVOH is a material that has a high degree of rigidity and is not suited for producing caps or spouts. With the body obtained by injection-forming the resin composition containing the HDPE and EVOH, therefore, the EVOH cannot follow up the deformation of the HDPE that occurs when the surface is rubbed. As a result, cracks and surface abrasion appear on the surface of the formed body. Here, the linear low-density polyethylene (LLDPE) is the one that is copolymerized with a small amount of α-olefin (e.g., 1-butene or the like), has a branch shorter than that of the low-density polyethylene, is highly linear, and exhibits a high degree of flexibility. Therefore, the LLDPE that has been modified with an acid undergoes the distribution around the EVOH that is distributed in the form of a layer or a belt, and exhibits adhesiveness between the two and, at the same time, exhibits a high degree of flexibility. As a result, when the surface of the formed body is rubbed, the interior thereof follows up the deformation in the surface layer, effectively avoiding the interfacial delamination between the HDPE and the EVOH and, presumably, preventing cracks and surface abrasion. Moreover, the LLDPE is highly linear. When put to the injection forming, therefore, the acid-modified LLDPE tends to be oriented in the direction in which it has fluidized and tends to be distributed around the EVOH that has been distributed in the form of a layer or a belt. As a result, the adhesiveness is, further, improved between the HDPE and the EVOH, presumably, contributing to suppressing the cracks and surface abrasion.

As described above, the body obtained by injection-forming the resin composition for injection forming of the present invention features excellent barrier property against oxygen as well as high degree of resistance against cracks and abrasion when the surface thereof is rubbed. Therefore, the formed body of the invention can be preferably used, particularly, in the field of packing materials, and is best suited for use as, for example, caps, spouts and the like.

MODES FOR CARRYING OUT THE INVENTION

The resin composition for injection forming of the present invention contains a high-density polyethylene (HDPE) as the main component and an ethylene-vinyl alcohol copolymer (EVOH) that works to improve the oxygen-barrier property as the sub-component. In addition to these basic components, the resin composition for injection forming, further, contains an acid-modified linear low-density polyethylene (acid-modified LLDPE).

<High-Density Polyethylene>

The high-density polyethylene (HDPE) used as the main component has a density which is as high as not less than 0.942 g/cm$^3$, has almost no branch, is highly crystalline, has excellent mechanical strength and surface slipperiness, and can be favorably used for forming, specifically, caps with a screw thread and spouts. The caps and spouts formed by using the above HDPE feature a large mechanical strength and, therefore, a high degree of slipperiness at the screw portions and excellent screw engagement. Therefore, the caps and spouts can be favorably used for packaging aseptic and sterilized contents.

The resin composition for injection forming of the present invention is, further, used for producing an injection-formed body to secure a high degree of oxygen-barrier property by permitting the ethylene-vinyl alcohol copolymer (EVOH) to be oriented and dispersed in the form of a layer or a belt. For this purpose, the invention uses the HDPE of the so-called injection forming grade having, preferably, an MFR (melt flow rate) at 190° C. of, for example, 0.1 to 10 g/10 min. When the MFR is too large, the fluidity is so high that the EVOH may not be dispersed in the form of the layer (belt). When the MFR is too small, on the other hand, the fluidity may become so small that the resin composition cannot be injection-formed.

<Ethylene-Vinyl Alcohol Copolymer>

The ethylene-vinyl alcohol copolymer (EVOH), as is well known, is a representative oxygen-barrier resin, and is used for imparting oxygen-barrier property to the injection-formed body.

As the EVOH of this kind, there is usually used an ethylene-vinyl acetate copolymer having an ethylene content of 20 to 60% by mol that is saponified to acquire a saponification degree of not less than 96% by mole and, specifically, not less than 99% by mol.

To form the body through the injection forming, the present invention uses the EVOH having an MFR of the injection grade. Here, the invention uses, specifically, the EVOH having the MFR in a range of 20 to 100 g/10 min. at 210° C. to have it oriented and dispersed in the form of a layer or a belt in the HDPE. Namely, the invention uses the EVOH having a suitable degree of fluidity relative to the HDPE; i.e., the EVOH is oriented and dispersed in the form of a layer or a belt so as to exhibit a high degree of oxygen-barrier property. The EVOH can be injection-formed even when it has an MFR that lies outside the above-mentioned range. In this case, however, the EVOH is dispersed homogeneously or in a granular form in the HDPE. As a result, the oxygen-barrier property tends to decrease.

The invention uses the EVOH in an amount of 35 to 90 parts by mass and, specifically, 45 to 70 parts by mass per 100 parts by mass of the high-density polyethylene. When used in an amount in excess of the above range, the EVOH cannot be easily oriented or dispersed in the form of a layer or a belt and it becomes difficult to obtain a high degree of oxygen-barrier property. When used in an amount smaller than the above range, on the other hand, the EVOH exhibits decreased oxygen-barrier property, as a matter of course.

<Acid-Modified Linear Low-Density Polyethylene>

As described already, the acid-modified linear low-density polyethylene (acid-modified LLDPE) is used for improving the adhesiveness between the HDPE and the EVOH, and works as a compatibilizer.

The linear low-density polyethylene (LLDPE) to be modified with an acid is obtained by copolymerizing an ethylene which is a recurring unit with a small amount of $\alpha$-olefin (e.g., 1-butene, 1-hexene, 4-methylpentene-1, 1-octene, etc.), has short branches that are introduced therein in a random fashion, has branches shorter than those of the LDPE, has a low density (e.g., 0.910 to 0.925 g/cm$^3$), comprises molecules which are highly linear, and is highly flexible.

The invention uses the acid-modified LLDPE obtained by modifying the LLDPE with an acid, and makes it possible to prevent the cracks and surface abrasion. When there is used, for example, an ordinary low-density polyethylene (LDPE) that is modified with an acid, it is not possible to prevent the cracks and surface abrasion. That is, the LDPE has an ethylene chain that includes branches of long chains. Due to this structure, the LDPE has a low density yet flexibility. Due to the possession of branches of long chains, however, the LDPE has a small degree of linearity and cannot be oriented in the direction in which it flows during the injection forming. Namely, the LDPE is not suited for forming a distribution structure in which it is oriented around the EVOH that is distributed in the form of a layer or a belt. It is, therefore, considered that the interfacial delamination easily occurs between the HDPE and the EVOH, and, as a result, the cracks and surface abrasion cannot be prevented.

As the acid for modifying the LLDPE, the invention uses an unsaturated carboxylic acid such as maleic acid, itaconic acid, fumaric acid or (meth)acrylic acid, or an acid anhydride thereof. Upon modifying the LLDPE with the above acid, a carbonyl group (>C=O) is introduced therein, and a high degree of adhesiveness is exhibited to the HDPE and the EVOH. The invention preferably uses the maleic acid or the maleic anhydride from the standpoint of cost and availability.

Further, to modify the LLDPE while maintaining its specific properties such as linearity and flexibility, it is desired that the acid has been introduced through the graft copolymerization. It is, further, desired that the degree of modification with acid (percentage of acid mass per the LLDPE) is in a range of 1.10 to 0.80.

From the standpoint of having the acid-modified LLDPE oriented and dispersed around the EVOH through the injection forming, furthermore, it is desired that the acid-modified LLDPE has the MFR (190° C.) in a range of 0.1 to 10 g/10 min.

The invention uses the acid-modified LLDPE in an amount of 10 to 35 parts by mass and, specifically, 15 to 30 parts by mass per 100 parts by mass of the high-density polyethylene. When the amount thereof is larger than the above range, the oxygen-barrier property of the EVOH is impaired. When the amount thereof is smaller than the above range, on the other hand, the interfacial delamination takes place easily between the EVOH and the HDPE, and the cracks and surface abrasion cannot be prevented.

<Other Components>

The resin composition for injection forming of the present invention can be blended with various kinds of blending agents that have been known per se., such as ultraviolet absorber, pigment, dye and filler depending upon the properties required for the body obtained through the injection forming in such amounts that would not impair the properties that would be exhibited by the components.

<Injection-Formed Body>

The resin composition for injection forming is formed into a predetermined shape through the injection forming.

The injection conditions are so set as to form such a structure that the HDPE serves as the matrix and the EVOH is distributed in the form of a layer or a belt in the matrix. For example, the resin composition is thrown into a kneading portion of a predetermined injection-forming machine, maintained at a temperature of 160 to 240° C. therein, and is injected into a mold maintained at a temperature of about 10 to about 50° C. at a rate of 5 to 80 mm/sec.

The thus formed body is capable of effectively preventing the cracks or the surface abrasion from taking place despite its surface is rubbed. Therefore, the formed body can be preferably used as a product that has a sliding portion such as a threaded portion yet featuring oxygen-barrier property, e.g., a container like a bottle, or a cap or a spout. Specifically, the formed body is best suited as the spout or the cap (particularly, threaded cap).

Further, by using such means as co-injection or insertion forming, the body can also be formed in a multilayered structure including the layer of the above-mentioned resin composition as the intermediate layer. Here, however, the injection-formed body of the present invention effectively prevents the cracks or the surface abrasion from taking place despite the surface is rubbed. Therefore, the body simply needs be formed in a single-layered structure using only the resin composition for injection forming. This is a great advantage of the present invention.

EXAMPLES

Excellent effects of the invention will now be described by way of Examples and Comparative Examples.

Also described are the materials used in these Examples and methods of evaluation.

High-density polyethylene (HDPE)
  B5803R produced by Keiyo Polyethylene Co.
  Density: 0.958 g/cm$^3$
  MFR (190° C.): 0.3 g/10 min.
Ethylene-vinyl alcohol copolymer (EVOH)
  K3850B produced by Nihon Gosei Kagaku Kogyo Co.
  Ethylene content: 38% by mol
  MFR (210° C.): 50 g/10 min.
Compatibilizer;
A. Maleic acid-modified linear low-density polyethylene (maleic acid-modified LLDPE)
  41E710 produced by du Pont Co.
  Modified degree: 1%
  MFR (190° C.): 2.7 g/10 min.
B. Maleic acid-modified low-density polyethylene (maleic acid-modified LDPE)
  L553 produced by Mitsubishi Chemical Co.
  MFR (190° C.): 1.5 g/10 min.

C. Maleic acid-modified high-density polyethylene (maleic acid-modified HDPE)
   4033 produced by du Pont Co.
   Modified degree: 1%
   MFR (190° C.): 2.0 g/10 min.
D. Maleic acid-modified polyethylene (maleic acid-modified PP)
   50E806 produced by du Pont Co.
   Modified degree: 0.5%
   MFR (230° C.): 25 g/10 min.
E. Maleic acid-modified styrene elastomer (maleic acid-modified SEBS)
   M1943 produced by Asahi Kasei Co.
   MFR (230° C.): 8.0 g/10 min.
F. Ionomer
   1855 produced by Mitsui•du Pont Polychemical Co.
   MFR (190° C.): 1.0 g/10 min.

The resin compositions prepared in Examples and Comparative Examples were evaluated in a manner as described below. Namely, each composition was injection-formed into a spout (opening diameter: 11 mm, thickness of body portion: 2 mm, height: 32 mm). A threaded cap of a polypropylene (surface hardness: Rockwell hardness of 90) was fitted to the threaded portion formed on the outer surface of the cylindrical body of the spout to evaluate as described below.

(Abrasion)

The formed spout was capped with the threaded polypropylene cap at a predetermined double-seaming angle, and was treated with the shower of hot water presuming the hot packing. Thereafter, the operation for opening the cap and closing the cap was repeated 20 times, and abrasion of the cylindrical body of the spout was observed with the eye and was evaluated:
   ○: No abrasion was recognized.
   X: Abrasion was recognized.

(Cracks)

The formed spout was capped with the threaded polypropylene cap at a predetermined double-seaming angle, and was treated with the shower of hot water presuming the hot packing. Thereafter, the cap was opened, and any cracks in the cylindrical body of the spout were observed with the eye and were evaluated:
   ○: No crack was recognized.
   X: Cracks were recognized.

(Oxygen-Barrier Property)

An aluminum film was stuck to the opening of the formed spout to make a sample for measurement. By using an oxygen permeability measuring apparatus "OX-IRAN (registered trademark) 2/21 manufactured by MOCON Co.", the amount of oxygen that has permeated through per a day under the condition of a temperature of 23° C. was measured.
   ○: Less than 0.002 cc/[pkg-day]
   X: Not less than 0.002 cc/[pkg-day]

Example 1

60 Parts by mass of the HDPE was blended with 30 parts by mass of the EVOH and 10 parts by mass of the compatibilizer A (maleic acid-modified LLDPE) to prepare a resin composition for injection forming. In other words, 100 parts by mass of the HDPE was blended with 50 parts by mass of the EVOH and 16.7 parts by mass of the compatibilizer A (maleic acid-modified LLDPE) to prepare a resin composition for injection forming.

The composition was injection-formed into a spout of the above-mentioned form and was evaluated for its properties to obtain the following results.
   Abrasion: ○
   Cracks: ○
   Oxygen-barrier property: ○

Example 2

55 Parts by mass of the HDPE was blended with 30 parts by mass of the EVOH and 15 parts by mass of the compatibilizer A (maleic acid-modified LLDPE) to prepare a resin composition for injection forming. In other words, 100 parts by mass of the HDPE was blended with 54.5 parts by mass of the EVOH and 27.3 parts by mass of the compatibilizer A (maleic acid-modified LLDPE) to prepare a resin composition for injection forming.

The composition was injection-formed into a spout of the above-mentioned form and was evaluated for its properties to obtain the following results.
   Abrasion: ○
   Cracks: ○
   Oxygen-barrier property: ○

Comparative Example 1

50 Parts by mass of the HDPE was blended with 30 parts by mass of the EVOH and 20 parts by mass of the compatibilizer A (maleic acid-modified LLDPE) to prepare a resin composition for injection forming. In other words, 100 parts by mass of the HDPE was blended with 60 parts by mass of the EVOH and 40 parts by mass of the compatibilizer A (maleic acid-modified LLDPE) to prepare a resin composition for injection forming.

The composition was injection-formed into a spout of the above-mentioned form and was evaluated for its properties to obtain the following results.
   Abrasion: ○
   Cracks: ○
   Oxygen-barrier property: X Comparative Example 2

A resin composition for injection forming was prepared in the same manner as in Example 1 but changing the compatibilizer A into a compatibilizer B (maleic acid-modified LDPE).

The composition was injection-formed into a spout of the above-mentioned form and was evaluated for its properties to obtain the following results.
   Abrasion: ○
   Cracks: X
   Oxygen-barrier property: ○

Comparative Example 3

A resin composition for injection forming was prepared in the same manner as in Example 1 but changing the compatibilizer A into a compatibilizer C (maleic acid-modified HDPE).

The composition was injection-formed into a spout of the above-mentioned form and was evaluated for its properties to obtain the following results.
Abrasion: X
Cracks: ◯
Oxygen-barrier property: ◯

Comparative Example 4

A resin composition for injection forming was prepared in the same manner as in Example 1 but changing the compatibilizer A into a compatibilizer D (maleic acid-modified PP).

The composition was injection-formed into a spout of the above-mentioned form and was evaluated for its properties to obtain the following results.
Abrasion: X
Cracks: X
Oxygen-barrier property: ◯

Comparative Example 5

A resin composition for injection forming was prepared in the same manner as in Example 1 but changing the compatibilizer A into a compatibilizer E (maleic acid-modified SEBS).

The composition was injection-formed into a spout of the above-mentioned form and was evaluated for its properties to obtain the following results.
Abrasion: X
Cracks: X
Oxygen-barrier property: ◯

Comparative Example 6

A resin composition for injection forming was prepared in the same manner as in Example 1 but changing the compatibilizer A into a compatibilizer F (ionomer).

The composition was injection-formed into a spout of the above-mentioned form and was evaluated for its properties to obtain the following results.
Abrasion: X
Cracks: X
Oxygen-barrier property: ◯

The invention claimed is:

1. An injection-formed body formed by a resin composition comprising a high-density polyethylene, an ethylene-vinyl alcohol copolymer, and an acid-modified linear low-density polyethylene,
   wherein the high-density polyethylene has a density in a range of not less than 0.942 g/cm$^3$ and an MFR at 190° C. in a range of 0.1 to 10 g/10 min,
   wherein the ethylene-vinyl alcohol copolymer has an MFR at 210° C. in a range of 20 to 100 g/10 min and is contained in an amount of 35 to 90 parts by mass of the high-density polyethylene,
   wherein the acid-modified linear low-density polyethylene has an MFR at 190° C. in a range of 0.1 to 10 g/10 min and is contained in an amount of 10 to 35 parts by mass per 100 parts by mass of the high-density polyethylene, and
   wherein the injection-formed body is a cap or a spout.

* * * * *